(12) United States Patent
Muscat et al.

(10) Patent No.: US 8,783,713 B2
(45) Date of Patent: Jul. 22, 2014

(54) AIRBAG DEVICE

(75) Inventors: Nathan Muscat, Victoria (AU); Gweltaz Jacq, Poitiers (FR)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 13/990,864

(22) PCT Filed: Nov. 29, 2011

(86) PCT No.: PCT/EP2011/005978
§ 371 (c)(1),
(2), (4) Date: Aug. 20, 2013

(87) PCT Pub. No.: WO2012/072234
PCT Pub. Date: Jun. 7, 2012

(65) Prior Publication Data
US 2013/0328292 A1    Dec. 12, 2013

(30) Foreign Application Priority Data
Dec. 3, 2010    (DE) .......................... 10 2010 053 175

(51) Int. Cl.
*B60R 21/276*     (2006.01)
*B60R 21/217*     (2011.01)

(52) U.S. Cl.
CPC ............. *B60R 21/276* (2013.01); *B60R 21/217* (2013.01)
USPC ......... 280/736; 280/742; 280/728.2; 280/739

(58) Field of Classification Search
CPC ...... B60R 21/276; B60R 21/217; B60R 21/20
USPC ................................. 280/736, 742, 728.2, 739
See application file for complete search history.

(56) References Cited

U.S. PATENT DOCUMENTS

| 5,234,229 | A |  | 8/1993 | Gordon |
| 6,082,765 | A | * | 7/2000 | Bowers et al. ................ 280/742 |
| 6,131,942 | A | * | 10/2000 | Fujii et al. .................. 280/728.2 |
| 6,588,795 | B2 | * | 7/2003 | Fischer et al. ................ 280/736 |
| 7,040,654 | B2 | * | 5/2006 | Selfa et al. ..................... 280/739 |

(Continued)

FOREIGN PATENT DOCUMENTS

| DE | 198 05 308 A1 | 10/1998 |
| DE | 299 06 477 U1 | 9/1999 |

(Continued)

OTHER PUBLICATIONS

PCT International Search Report—Mar. 2, 2012.

(Continued)

*Primary Examiner* — Drew Brown
(74) *Attorney, Agent, or Firm* — Brinks Gilson & Lione

(57) ABSTRACT

An airbag device with an airbag module (1) for attachment to a structural part of a motor vehicle with a housing (2), an airbag (3) arranged therein, a gas generator (4), as well as a support (5) via which the airbag module (1) can be attached to a motor vehicle component, wherein a fastener (41) is positioned on a gas generator (4) via which the gas generator (4) can be attached to the housing (2) and/or the support (5). On the support (5) and/or on the housing (2) at least one spacer (21, 51) is provided between the housing (2) and the support (5), between the housing (2) and the gas generator (4), and/or between the support (5) and the gas generator (3), in the form of cavities in which a discharge channel (22, 52) is constructed in the plane of the intermediate area formed by the spacers (21, 51).

14 Claims, 6 Drawing Sheets

(56) References Cited

U.S. PATENT DOCUMENTS

| | | | |
|---|---|---|---|
| 7,393,010 B2* | 7/2008 | Andersson | 280/739 |
| 7,775,554 B2* | 8/2010 | Smydra et al. | 280/736 |
| 8,191,926 B2* | 6/2012 | Schneider | 280/739 |
| 2004/0164536 A1* | 8/2004 | Selfa et al. | 280/739 |
| 2008/0284144 A1 | 11/2008 | Smydra et al. | |

FOREIGN PATENT DOCUMENTS

| | | |
|---|---|---|
| DE | 10 2006 020 575 A1 | 11/2006 |
| DE | 10 2005 060 685 A1 | 12/2006 |
| DE | 10 2005 049 335 A1 | 4/2007 |
| EP | 0 974 497 A1 | 1/2000 |
| SE | WO 03/002383 A1 | 1/2003 |
| WO | WO 03/101782 A2 | 12/2003 |

OTHER PUBLICATIONS

German Examination Report—Sep. 12, 2011.

\* cited by examiner

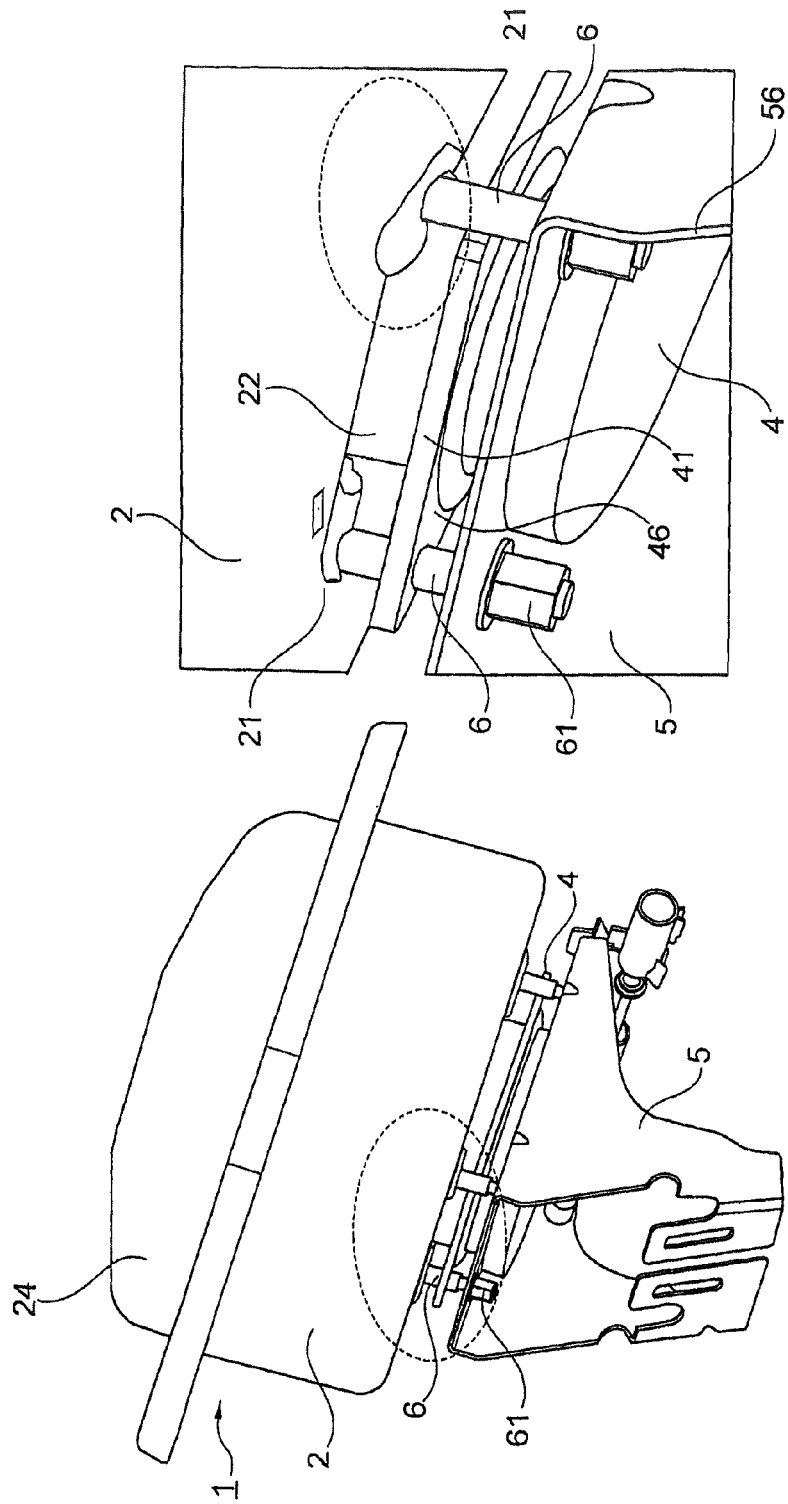

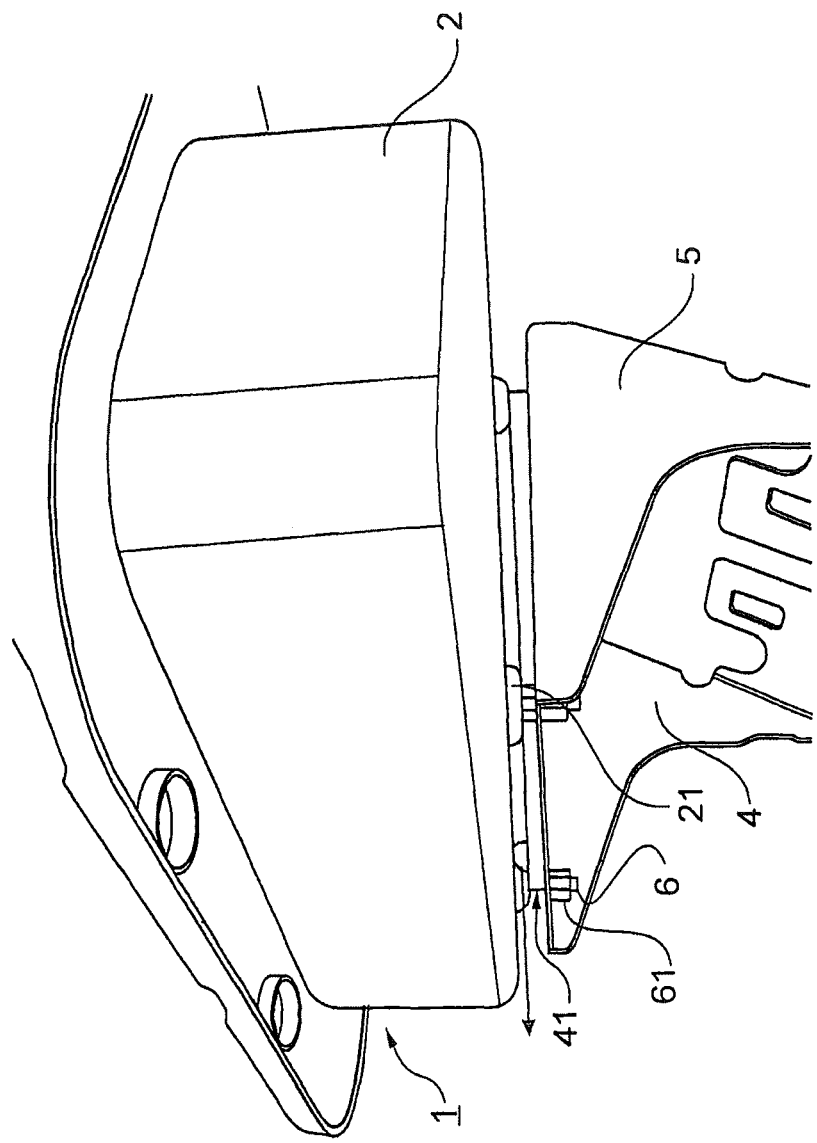

AIRBAG DEVICE

CROSS-REFERENCE TO RELATED APPLICATION

This application claims priority to German Patent Application No. 10 2010 053 175.8, filed Dec. 3, 2010 and PCT/EP2011/005978, filed Nov. 29, 2011.

FIELD OF THE INVENTION

The invention relates to an airbag device with an airbag module for attachment to a structural part of a motor vehicle with a housing, an airbag arranged therein, a gas generator, as well as a support via which the airbag module can be attached to a motor vehicle component. A fastener is positioned on a gas generator via which the gas generator can be attached to the housing and/or the support. The airbag device is constructed in particular as a driver airbag or a passenger airbag and serves in particular for protection in a frontal impact of the vehicle.

BACKGROUND

WO 2003/002383 describes an airbag arrangement on a motor vehicle with a gas generator which forms a peripheral shoulder. The gas generator is secured on a flange via bolts. Positioned and secured between the shoulder and the flange is an airbag of textile material. Distance spacers are positioned between the airbag material and the shoulder. Through-holes are drilled through the spacer and the base plate of the flange through which screw-bolts can be guided. The gas generator and the flange are secured to each other via the screw-bolts (threaded fasteners). The airbag textile forms recesses through which the screw bolts are guided. Slide areas are provided on the screw-bolts so that the airbag can slide along them. During the unimpeded filling with deployment gas, the airbag rests upon the bottom side of the shoulder; if the deployment is impeded, the airbag slides away from the shoulder and allows the deployment gas to escape through the intermediate area between the shoulder and the spacer. The design according to the prior art is very expensive.

The object of this invention is therefore to make available an airbag device which is simple to assemble and manufacture and which also facilitates a precise guidance of the flow of deployment gas.

SUMMARY

The above described object is inventively achieved by an airbag device having the features described herein; advantageous embodiments and further developments of the invention are shown in the description, and the figures.

The inventive airbag with an airbag module for attachment to a structural part of a motor vehicle with a housing, an airbag arranged therein, a gas generator, as well as a support via which the airbag module can be attached to a vehicle component, wherein a fastener is arranged on a gas generator via which the gas generator can be attached to the housing and/or the support. At least one spacer may be provided between the housing and the support, between the housing and the gas generator and/or between the support and the gas generator is arranged on the support and/or on the housing in the form of a cavity in which a discharge channel is constructed in the plane of the intermediate area formed by the distance spacers. The airbag module with the housing, the airbag, and the gas generator together with the support form the airbag device.

Upon the detection of an accident or an impending accident, the airbag located inside the housing deploys in the direction of the vehicle passengers or in front of a structural component part of the vehicle in order to protect the vehicle passengers and to prevent or reduce an impact of the passengers against the structural component part or a displacement of the vehicle passengers inside the vehicle. If a vehicle passenger is not located in the normally provided position during the deployment process or if the deployment, process is impeded by obstacles, it is an advantage if a venting opening is released through which the deployment gas can escape. It is advantageous if the venting opening is not placed within the airbag, since a venting opening arranged in this manner would slow the normal deployment process. It is advantageous for a normal deployment process if no deployment gas escapes from the airbag in order that it fills as quickly as possible and expands in front of the vehicle passenger. A venting opening in the airbag textile itself can also conduct the deployment gas in the direction of the vehicle passengers which can be disadvantageous.

Thus the invention provides that at least one spacer is constructed on the support, on the housing, or on both components, s the spacer is constructed in a shape to form a cavity. These cavities are in particular spacers in the form of recesses or bulges which are constructed by shaping and molding of the support and/or the housing. These cavities serve as spacers between the housing, the support, and the gas generator, wherein the gap or intermediate space is, provided depending on the orientation of the cavities. The gap or intermediate space can be constructed between the housing and the support, for example if the housing is secured directly on the support. It is also possible that a free space is constructed between the housing and the gas generator, if for example the gas generator is positioned externally underneath the housing and projects into the airbag. It is also possible that a free space is constructed between the support and the gas generator by the spacer(s), in order to facilitate the passage of the deployment gas from the housing through the cavity into the discharge channel. From the discharge channel the deployment gas is supplied into the plane of the intermediate space formed by the spacer, namely into the plane between the housing and the support, between the housing and the gas generator, or between the gas generator and the support. The discharge of the deployment gas into the plane of the intermediate area enables a basically unimpeded outflow of the deployment gas in a situation in which the vehicle passenger is located away from the normal position. The outflow behavior in out-of-position cases can be influenced as desired by the size of the cavities and the discharge channel as well as its orientation. During an unimpeded deployment, no gas escapes out of the discharge channels (or an insignificant amount), so that a rapid deployment of the airbag can occur. It is also possible that a plurality of spacers formed as cavities can be employed.

A further development of the invention provides that the spacer(s) is/are constructed as a single piece on the support or the housing, that is integrated into the support or the housing. If spacers are used on the housing and the support, the spacers can be constructed as a single piece on the housing and the support.

Pass-through openings for securing means, in particular screw-bolts or fastening pins, can be provided in the spacer(s), so that the individual components can be attached to each other and affixed inside the vehicle. The securing means serve in particular to affix the airbag, the housing, and the gas generator to the support, so that after deployment of the airbag it can be held securely on the vehicle components.

The spacer(s) is/are preferably constructed on the side of the housing or support turned away from the airbag, so that because of the cavity formed in the spacer, a pocket results which points away from the airbag, so that a flow path leading away from the airbag is formed. In the area of the spacer the airbag lying above it can exhibit a recess which is aligned corresponding to the cavity, so that during an impeded deployment the deployment gas can easily exit from the cavity and the discharge channel.

The gas generator can project into the housing, whereby the airbag exhibits an opening through which the gas generator can be introduced into the airbag and which stands in a fluidic connection to the spacer(s). In addition, the deployment gas can move through the opening, for example an intermediate area between the gas generator and the opening circumference, to the spacer(s) and thus to the respective discharge channel and escape through this into the environment.

The discharge channel can be oriented in the direction of the gas generator in order not to damage surrounding vehicle components or structural components when deployment gas is vented. Alternatively, the discharge channel can also point away from the gas generator in order to facilitate a quick escape of the deployment gas into the environment.

The support and the housing can be made of metal or a plastic and also the use of composite materials, like fiber-reinforced plastics or molded metals, is possible.

A retaining ring can be positioned in the airbag via which the airbag is attached to the housing. In this manner it is possible to externally attach the airbag with a shoulder on the housing or the support and to attach it using securing means which project out of the housing or through the support and to complete the airbag device.

The entire airbag device can be provided as a subassembly module and be completed in a preassembled manner.

BRIEF DESCRIPTION OF THE DRAWINGS

In the following section, embodiments of the invention will be explained in more detail using the attached figures. The same reference designations designate the same components. Shown are:

FIG. 1 is a view in perspective of an airbag device in accordance with this invention;

FIG. 2 is a detailed view of a portion of an airbag device shown in FIG. 1;

FIG. 3 shows a finished, mounted airbag device of the type shown by FIGS. 1 and 2;

ADDITIONAL DETAILED DESCRIPTION

Figure 5:
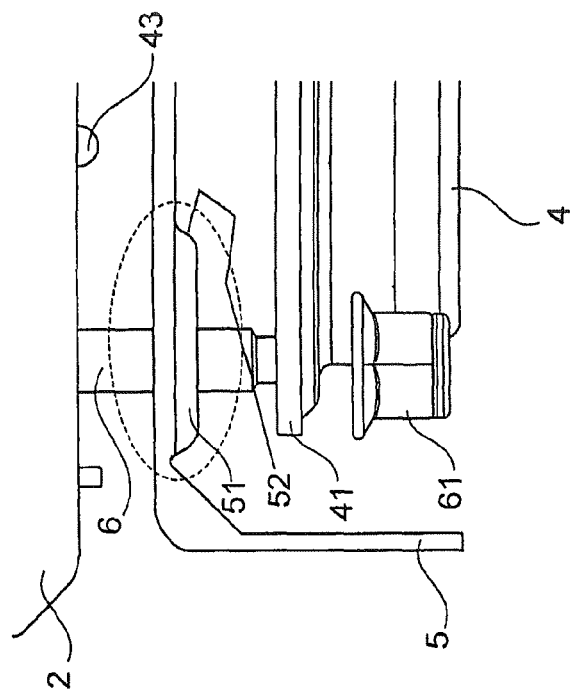
FIG. 5 is a detailed view of a portion of FIG. 4.

An airbag device with an airbag module 1 and a support 5 is shown in FIG. 1; the airbag device 1 is especially suited for a driver and passenger airbag but is not limited thereto. The support 5 serves to secure the airbag module 1 to a structural component, for example a traverse girder (being or bracket) in a vehicle. The support 5 is constructed as a sheet metal part and exhibits a central opening 54 into which a gas generator 4 can be introduced. The airbag module 1 consists of a housing 2 with an airbag 3 positioned therein which is held in the housing 2 via a covering 24. The housing 2 can be made of plastic or a metal. The gas generator 4 is guided into the housing 2 through an opening constructed on the bottom side. A fastener plate is constructed on the gas generator 4 as a flange 41 which protrudes radially outward and forms openings 46 through which securing means 6 in the form of screw-bolts can be guided. The securing means 6 are either constructed on the housing 2 or pass-through openings in the housing floor. In addition, the securing means 6 in the form of screw-bolts extend through the support 5, so that a fastening of the housing 2 on the support 5 can take place via a nut 61. The gas generator 4 is clamped with its flange 41 between the base of the housing 2 and the support 5.

The attachment detail of the housing 2 on the support 5 is depicted in FIG. 2 in an enlarged portrayal. The support 5 with the opening 54 for the gas generator 4 as well as with pass-through openings 56 for the securing means 6 forms the basis for the accommodation of the gas generator 4 which is disposed on the top side of the support 5 with the radial flange 41 protruding from a cylindrical body. Pass-through openings 46 for the securing means 6 are provided in the flange 41. The securing means 6 can either be individually affixed on the housing 2, be constructed on it, or be positioned on a non-depicted retaining ring inside the housing 2. The retaining ring is located inside the non-depicted airbag and attaches the airbag around the gas generator 4 on the housing 2. Spacers 21 are shaped on the bottom side of the housing 2 which forms a discharge channel 22 that is oriented in the embodiment shown in the direction of the gas generator 4. The spacers 21 are formed by shaping and molding, for example squeezing, compressing, and pressing, of the same in the base of housing 2. A cavity is formed in the underside of the housing 2 by the spacers 21, so that deployment gas can escape in a controlled manner in a plane between the flange 41 of the gas generator and the housing base during an impeded deployment of the airbag. The gas generator 4 is clamped with the flange 41 between the base of housing 2 at the locations of the spacers 21 and the support 5. Available are four spacers 21 provided on the housing base, so that the housing 2 rests stably on four support areas on the topside of the support 5. Discharge openings (not shown) of gas generator 4 open into the gap between flange 41 and the base of housing 2.

In the embodiment depicted, the securing means 6 extend through the spacers 21; alternative embodiments provide that the securing occurs at locations on, or also at locations on the other side of the spacers 21.

Shown in FIG. 3 is the airbag module 1 with a support 5 in the mounted condition without a cover 24. Formed by the spacers 21 between the flange 41 of the airbag 4 and the base of the housing 2 is an intermediate space into which the deployment gas can flow during an impeded deployment of the gas bag. The deployment gas is thus guided in the event of an all-around "out-of-position impact" into the planar gap between the gas generator flange 41 and the base of housing 2 and can escape into the environment as designated by the arrow in FIG. 3.

Figure 4:
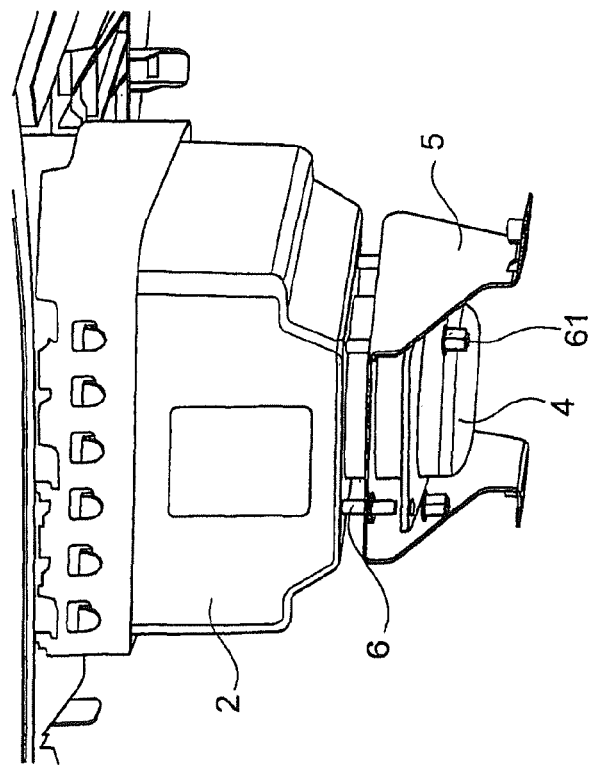
FIG. 4 shows a side view of one variant of an airbag in accordance with this invention shown in a partially exploded manner.

One variant of the invention is shown in FIG. 4. The basic construction corresponds to that of FIG. 1, but spacers 51 are not constructed on the bottom side of the housing 2 but instead on the bottom side of the support 5, as shown in FIG. 5. A further difference is that the gas generator 4 with its flange 41 is not positioned between the housing base and the support 5, but instead on the bottom of the support 5 beneath the spacers 51.

FIG. 5 shows a detailed depiction of the construction of the housing 2, the support 5, and the gas generator 4 of FIG. 4 on an enlarged scale. The spacers 51 with the discharge channel 52 can be recognized and the outflow openings 43 of the gas generator can likewise be recognized through which deployment gas flows radially outward into the airbag. In the assembled condition, the base of housing 2 rests on the support 5; the flange 41 of the gas generator 4 is affixed on the support 5 with a separation from the support provided by a spacer 51. Deployment gas escapes out of the housing 2 through the hollow space formed by the spacer 51 and the discharge channel 52 into the planar gap between the gas generator flange 41 and the support 5, either in the direction of the gas generator 4, away from it, or in the circumferential direction to it.

Figure 6:
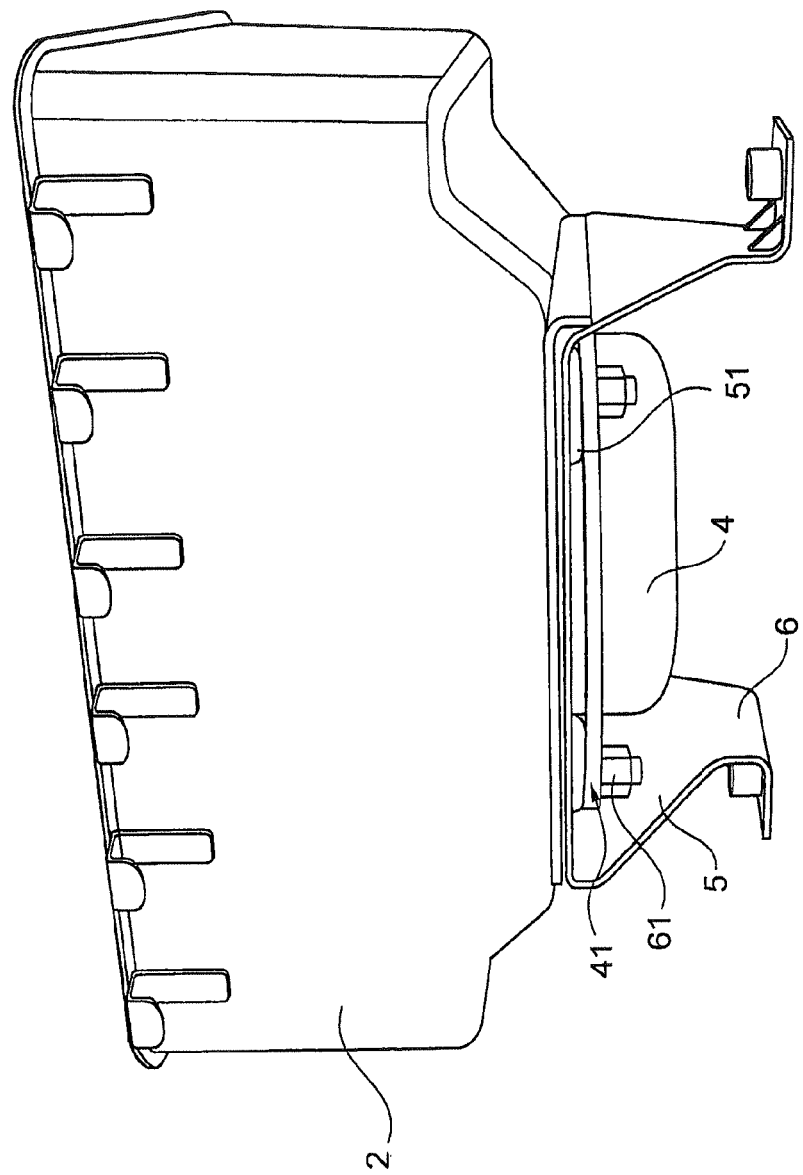
FIG. 6 is a view in perspective of the airbag device according to FIG. 4 in an assembled condition.

The final assembled condition of the embodiment according to FIGS. 4 and 5 is shown in FIG. 6. The outflow direction of the deployment gas from the discharge channels of the spacers 51 between the gas generator flange 41 and the support 5.

Figure 7:
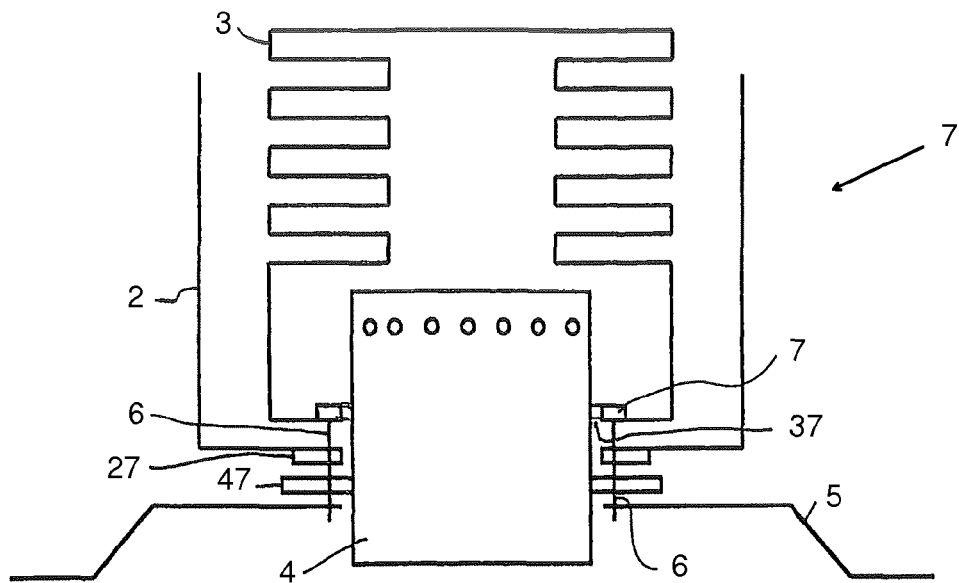
FIGS. 7-9 are schematic depictions of and airbag device in accordance with this invention.

An airbag device with an airbag module 1 and a support 5 mounted thereon is shown in FIG. 7 in a schematic depiction. A fastener plate in the shape of a shoulder or ring flange 41 is positioned on the gas generator 4 which is guided into the airbag 3 through an opening 31. The gas generator can be affixed on the housing 2 and the support 5 via the flange 41. Positioned inside the airbag 3 is a retainer ring 7 on which the securing means 6 are positioned in the form of screw-bolts. Screw-bolts 6 project into the airbag 3 and are guided through non-depicted pass-through openings into the housing 2, the fastener 41, and the support 5. In the variant according to FIG. 7 the spacers 21 with the non-depicted discharge channel are positioned on the underside of the housing 2 and rest against the flange 41 of the gas generator 4. The support 5 is screwed on the flange 41 from below.

Figure 8:
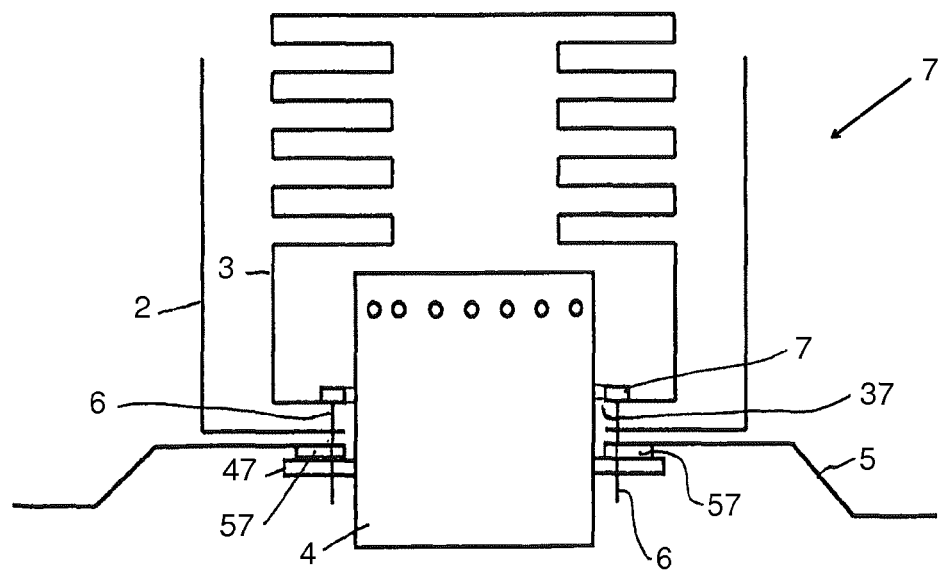

A variation of the invention is shown in FIG. 8 in which the spacers 51 are constructed on the bottom side of the support 5. The deployment gas flows through a gap between the airbag 3 and the gas generator 4 as well as the housing 2 and the gas generator 4 into a cavity which is formed by the spacer 51 and from there out the side and into the environment.

Figure 9:
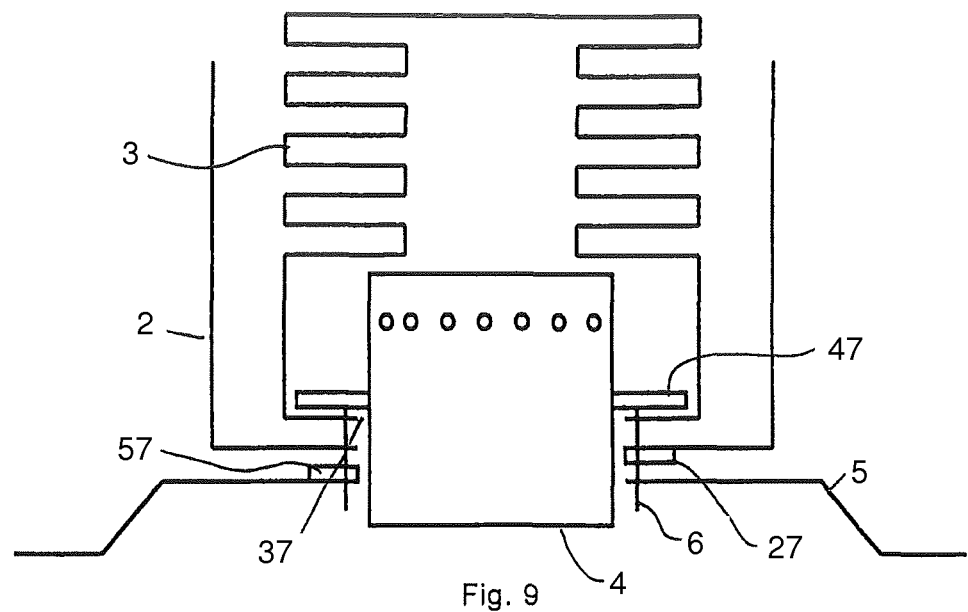

Another variant is shown in FIG. 9 in which the gas generator 4 together with the flange 41 is positioned in the airbag 3. The securing means 6 are affixed on the fastener 41 or constructed thereon and project through the housing 2 with the spacers 21 positioned on the underside. Supplementing the spacers 21 on the housing 2 are spacers 51 constructed on the support 5 which bulge out of the support 5 in the direction of the housing 2. In conjunction with the spacers 21 of the housing 2, a stable support of the housing 2 on the support 5 is made available.

It is basically possible and envisioned that instead of several spacers 21 only one spacer 21 is provided through which the deployment gas can escape.

While the above description constitutes the preferred embodiment of the present invention, it will be appreciated that the invention is susceptible to modification, variation and change without departing from the proper scope and fair meaning of the accompanying claims.

The invention claimed is:

1. An airbag device comprising an airbag module for attachment to a structural part of a motor vehicle having a housing, an airbag arranged within the housing, a gas generator, a support outside the housing for attaching the airbag module to the structural part, wherein a flange is positioned on the gas generator via which the gas generator is attached to the housing or the support, wherein the support or the housing forms at least one spacer for creating a cavity in at least one of three locations, the three locations being between the housing and the support, between the housing and the flange, and between the support and the flange, the cavity forming a permanently unobstructed discharge channel for a flow of deployment gas produced by the gas generator.

2. The airbag device according to claim 1, wherein the at least one spacer is constructed as an integral portion of at least one of the support and the housing.

3. The airbag device according to claim 1, wherein pass-through openings for securing means of the housing or the gas generator are formed adjacent to the at least one spacer.

4. The airbag device according to claim 1, wherein the at least one spacer is constructed on a side of the housing or the support turned away from the airbag.

5. The airbag device according to claim 1 further comprising in that the gas generator projects into the housing and the airbag forms an opening through which the gas generator can be introduced into the airbag and which stands in a fluidic connection to the at least one spacer.

6. The airbag device according to claim 1 further comprising in that the discharge channel is oriented in the direction of the gas generator.

7. The airbag device according to claim 1 further comprising in that the support and the housing are constructed of a metal or a plastic.

8. The airbag device according to claim 1 further comprising in that a retainer ring is attached to the housing which secures the airbag to the housing.

9. The airbag device according to claim 1 further comprising that the gas generator forms gas discharge openings which are in communication with the discharge channel.

10. The airbag device according to claim 2 further comprising in that the at least one spacer is in the form of a tab, a flange, a recess, or a bulge.

11. The airbag device according to claim 1 wherein the discharge channel enables the venting of the deployment gas from the gas generator in the case that the airbag module is deployed and the deployment is obstructed by an out-of-position occupant of the motor vehicle, and wherein the deployment gas does not vent in a significant manner through the discharge channel upon the deployment of the airbag module wherein the deployment is not obstructed.

12. The airbag device according to claim 1 wherein the cavity is in the form of a planar gap.

13. The airbag device according to claim 1 wherein the housing, the airbag, and the gas generator are preassembled for attachment to the support as a subassembly.

14. The airbag device according to claim 1 wherein the spacers are located outside the housing.

* * * * *